ус011939049B2

United States Patent
Jung et al.

(10) Patent No.: US 11,939,049 B2
(45) Date of Patent: Mar. 26, 2024

(54) AIR MOBILITY VEHICLE

(71) Applicants: Hyundai Motor Company, Seoul (KR); Kia Corporation, Seoul (KR)

(72) Inventors: Woo Suk Jung, Hwaseong-si (KR); Hee Kwang Lee, Suwon-si (KR); Hyun Seok Hong, Seoul (KR); Hyun Woo Jun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/947,357

(22) Filed: Sep. 19, 2022

(65) Prior Publication Data
US 2023/0020198 A1 Jan. 19, 2023

Related U.S. Application Data

(62) Division of application No. 17/190,081, filed on Mar. 2, 2021.

(30) Foreign Application Priority Data

Oct. 16, 2020 (KR) .................. 10-2020-0134379

(51) Int. Cl.
*B64D 35/02* (2006.01)
*B60L 53/00* (2019.01)
(Continued)

(52) U.S. Cl.
CPC .............. *B64C 27/82* (2013.01); *B60L 53/00* (2019.02); *B60L 58/12* (2019.02); *B64C 27/32* (2013.01);
(Continued)

(58) Field of Classification Search
CPC .......... B64D 2027/026; B64D 29/0006; B64C 29/04; B64C 29/0025
See application file for complete search history.

(56) References Cited

U.S. PATENT DOCUMENTS 1,627,856 A * 5/1927 MacVicar ........... B64C 29/0025
244/17.17
6,892,979 B2 5/2005 Milde, Jr.
(Continued)

FOREIGN PATENT DOCUMENTS

KR 101828924 B1 * 2/2018
KR 101828924 B1 2/2018

*Primary Examiner* — Timothy D Collins
*Assistant Examiner* — Justin Michael Heston
(74) *Attorney, Agent, or Firm* — Slater Matsil, LLP

(57) ABSTRACT

In an air mobility vehicle, an engine operates as required to provide mechanical driving force or electric energy. A battery is charged with the electric energy from the engine. Main rotors operate using the electric energy of the battery and electric power generated by the engine to perform takeoff, landing, and cruising. Auxiliary rotors are disposed at or adjacent to the center of gravity of a vehicle body and mechanically connected to the engine via a clutch. The auxiliary rotors perform the takeoff, the landing, or the cruising by receiving the mechanical driving force from the engine when the clutch is in an engaged position. A controller monitors the states of the battery and the main rotors and controls the operations of the engine and the clutch.

20 Claims, 4 Drawing Sheets

(51) Int. Cl.
- *B60L 58/12* (2019.01)
- *B64C 27/32* (2006.01)
- *B64C 27/82* (2006.01)
- *B64C 29/00* (2006.01)
- *B64D 27/02* (2006.01)
- *B64D 27/24* (2006.01)
- *B64D 31/00* (2006.01)
- *B64D 31/10* (2006.01)
- *B64D 31/12* (2006.01)
- *B64D 33/02* (2006.01)

(52) U.S. Cl.
CPC .......... *B64C 29/0025* (2013.01); *B64D 27/02* (2013.01); *B64D 27/24* (2013.01); *B64D 31/00* (2013.01); *B64D 31/10* (2013.01); *B64D 31/12* (2013.01); *B64D 33/02* (2013.01); *B64D 35/02* (2013.01); *B60L 2200/10* (2013.01); *B64C 2027/8227* (2013.01); *B64D 27/026* (2024.01); *B64D 2033/0213* (2013.01)

(56) References Cited

U.S. PATENT DOCUMENTS

| | | | |
|---|---|---|---|
| 2004/0056154 A1 | 3/2004 | Milde, Jr. | |
| 2013/0251525 A1* | 9/2013 | Saiz | B64C 27/26 416/23 |
| 2016/0207624 A1* | 7/2016 | Hymer | B64D 27/18 |
| 2018/0362169 A1* | 12/2018 | Du | B64C 39/08 |
| 2020/0324891 A1* | 10/2020 | Evulet | B64D 27/16 |
| 2020/0331601 A1* | 10/2020 | Sabie | B64C 27/82 |
| 2021/0078700 A1* | 3/2021 | Klemen | B64D 35/02 |

\* cited by examiner

AIR MOBILITY VEHICLE

CROSS-REFERENCE TO RELATED APPLICATIONS

This application is a divisional of U.S. patent application Ser. No. 17/190,081, filed Mar. 2, 2021, which claims the benefit of Korean Patent Application No. 10-2020-0134379, filed on Oct. 16, 2020, which applications are hereby incorporated herein by reference.

TECHNICAL FIELD

The present invention generally relates to an air mobility vehicle.

BACKGROUND

Related-art methods of using fans and impellers as lifting devices have been proposed for fixed-wing vertical takeoff and landing (VTOL) aircrafts, small private air vehicles (PAVs), or the like able to operate at a higher speed than helicopters. However, when such fan-based lifting devices devised for such VTOL aircrafts or PAVs are used in urban air mobility (UAM) vehicles, the following problems may occur: 1) Flight efficiency is low, since a significant amount of power consumption occurs during the generation of lift, 2) in case of air mobility vehicles for carrying passengers, a passenger space may be reduced, since fans used as main propulsion devices are required to occupy a significant space in order to generate propulsion force, and 3) when fans are used as main propulsion devices, performance and flight reliability may be significantly lowered by inlet flow separation or the like during forward maneuvers, due to the characteristics of the fans.

Accordingly, the application of such fan-based propulsion devices of the related art for UAM vehicles is limited, and in the application of propulsion devices, a layout and a mounting plan need to be determined in consideration of passenger space and power consumption.

The vertical takeoff and landing maneuver of rotors in the maneuvers of UAM vehicles is a factor that has a high accident rate and thus must be considered with top priority to provide high reliability. An auxiliary propulsion device is a device that provides safety to an air mobility vehicle in an emergency, such as a breakdown of a rotor or a malfunction of a distributed electric propulsion system, during the vertical takeoff or landing operation. In an UAM vehicle having a relatively smaller number of passengers, the center of gravity of the vehicle body is present in the position of the cabin in a large number of cases. However, when the auxiliary propulsion device is mounted in the position of the cabin, an available space for the cabin may be reduced and drag applied to the belly of the UAM vehicle may be increased, which are problematic.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind problems occurring in the related art. Particular embodiments of the present invention provide an air mobility vehicle able to perform a vertical takeoff and landing function and a cruising function. In an embodiment, the air mobility vehicle has a structure able to reliably provide auxiliary propulsion force, thereby increasing the safety of flight when the propulsion force of main rotors is insufficient or at least one of the main rotors malfunctions, and in particular, able to flexibly perform a responsive operation to balance the vehicle body when at least one of the main rotors malfunctions so that propulsion is unbalanced in a transverse direction.

According to one embodiment of the present invention, an air mobility vehicle includes an engine operating as required to provide mechanical driving force or electric energy, a battery configured to be charged with the electric energy from the engine, main rotors operating using the electric energy of the battery and the electric power generated by the engine to perform takeoff, landing, and cruising, auxiliary rotors disposed at or adjacent to the center of gravity of a vehicle body and mechanically connected to the engine via a clutch, the auxiliary rotors performing the takeoff, the landing, or the cruising by receiving the mechanical driving force from the engine when the clutch is in an engaged position, and a controller monitoring the states of the battery and the main rotors and controlling the operations of the engine and the clutch.

The engine may be an internal combustion engine.

The battery may be provided in the separate place such as behind a cabin or collinear with the wings of the vehicle body, and the main rotors may be provided to the right and left of the battery in the same numbers.

The auxiliary rotors may be provided to the right and left of the cabin.

The auxiliary rotors may be provided to be consistent with the center of gravity of the vehicle body in a transverse direction while being located at a distance within 0.002 times the length of the vehicle body from the center of gravity of the vehicle body in a longitudinal direction.

The engine may be located at a point between the auxiliary rotors and the battery. The engine may be provided with a drive shaft in a front portion thereof. Portions of a division shaft extending to right and left may receive driving force via the drive shaft. The auxiliary rotors may be rotated by the division shaft.

The auxiliary rotors may be oriented in a vertical direction to provide auxiliary propulsion force in a downward direction, thereby assisting in lifting of the vehicle body.

The air mobility vehicle may further include covers concealing the auxiliary rotors. When the auxiliary rotors are driven, the covers may be slid so that the auxiliary rotors are exposed externally so that the auxiliary rotors draw air from above and discharge the drawn air downwards.

When the state of charge of the battery is low, the controller may charge the battery or support the power supply to the main rotor by operating the engine. When driving force of the main rotors is insufficient or the main rotors malfunction, the auxiliary rotors may be driven by moving the clutch to the engaged position.

When the driving force of the main rotors is insufficient, the controller may generate the same auxiliary propulsion force on a right side and a left side by opening both the covers of the right and left auxiliary rotors.

When one of the right and left main rotors malfunctions, the controller may open one of the covers on the same side as the malfunctioning main rotor, thereby generating auxiliary propulsion on the side in which the malfunction has occurred.

Each of the auxiliary rotors may include an inlet and an outlet by which an air flow is produced. The auxiliary rotor may be rotatably coupled to the vehicle body. The direction of the outlet may be changed when the auxiliary rotor rotates.

The auxiliary rotor may include a centrifugal compressor-type rotor that draws air in a direction of a rotor shaft thereof and discharges the air in a radial direction. The auxiliary rotor may be disposed such that the rotor shaft is directed toward the center of gravity of the vehicle body. The inlet may be provided at a portion in which the rotor shaft is provided, such that the inlet is oriented in the same direction even when the auxiliary rotor rotates.

The outlet may be provided in the radial direction of the auxiliary rotor such that the auxiliary rotor assists in lifting propulsion or cruising propulsion in response to rotation thereof.

The vehicle body may include an air intake in a front portion thereof. The air intake may supply air to the inlets of the auxiliary rotors located on both sides through an internal duct.

In the air mobility vehicle having the vertical takeoff and landing function and the cruising function according to embodiments of the present invention, when the propulsion force of the main rotors is insufficient or at least one of the main rotors malfunctions, auxiliary propulsion force may be reliably provided so as to increase the safety of flight. In particular, even when one of the main rotors malfunctions so that propulsion is unbalanced or the lifting function or the cruising function malfunctions, a responsive operation may be flexibly performed so as to balance the vehicle body.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
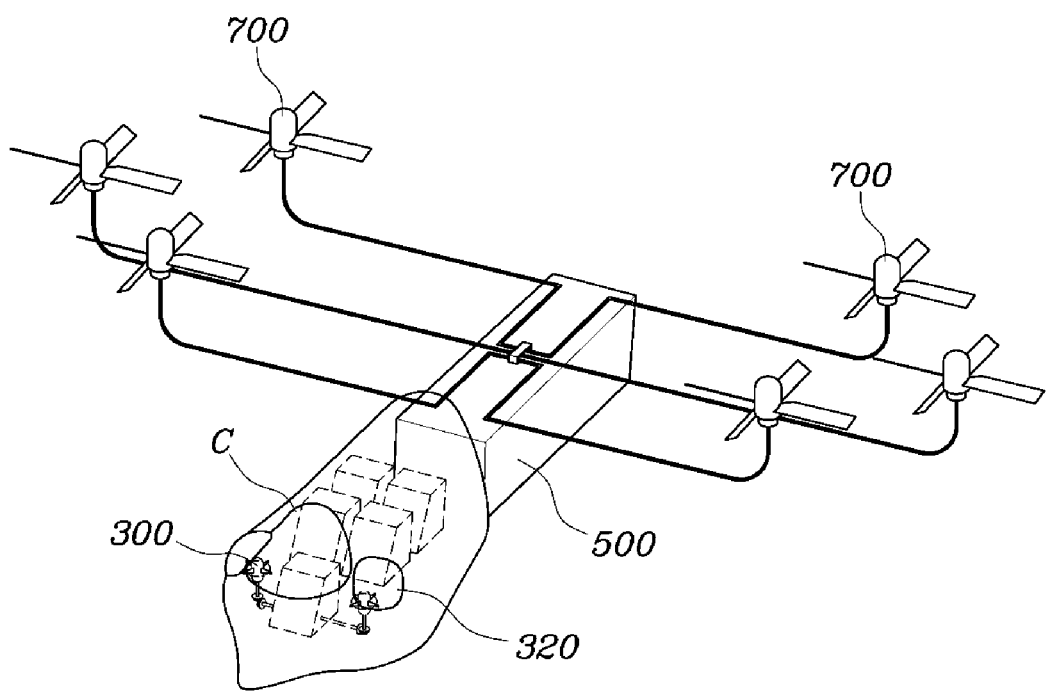
FIGS. 1 and 2 are conceptual views illustrating an air mobility vehicle according to an embodiment of the present invention.
Figure 2:
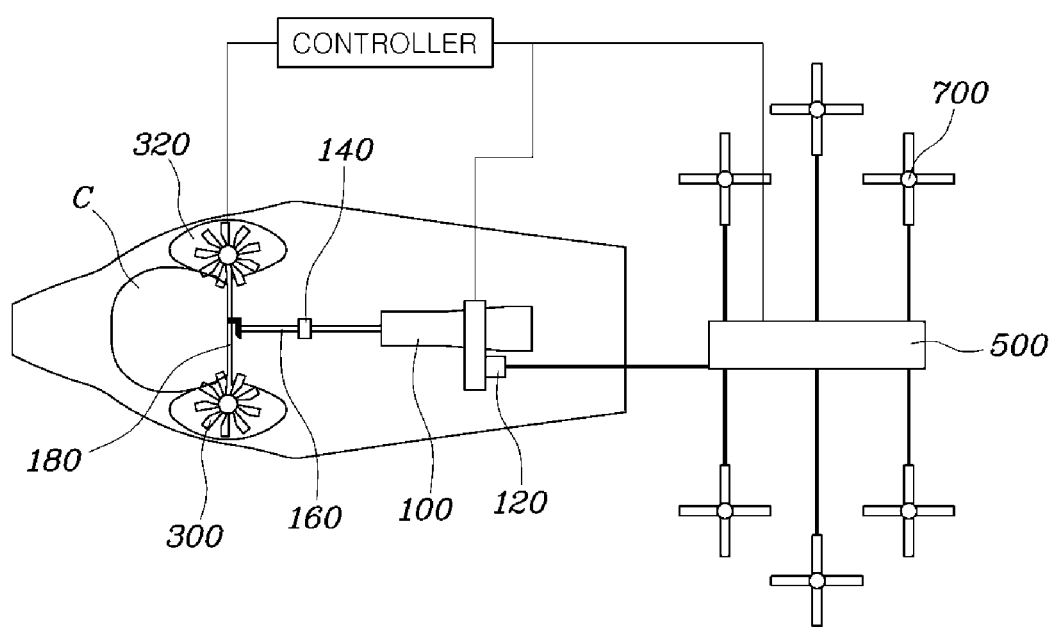
Figure 3:
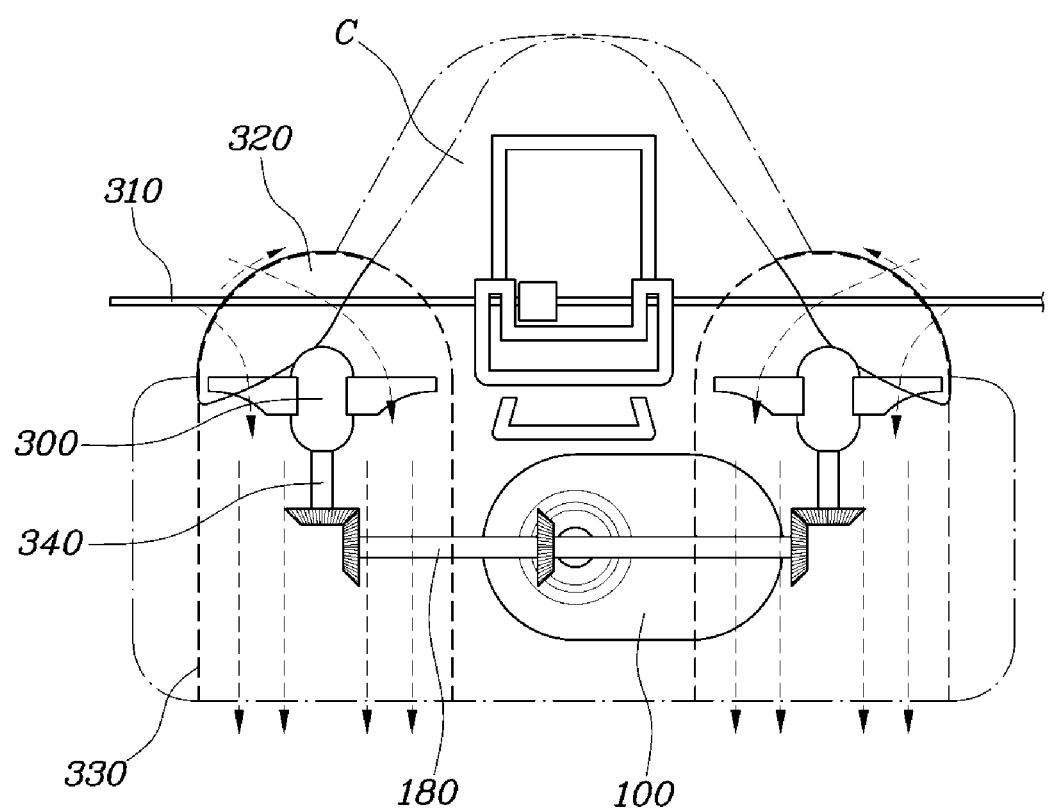
FIG. 3 is a diagram illustrating an auxiliary rotor of the air mobility vehicle according to an embodiment of the present invention.
Figure 4:
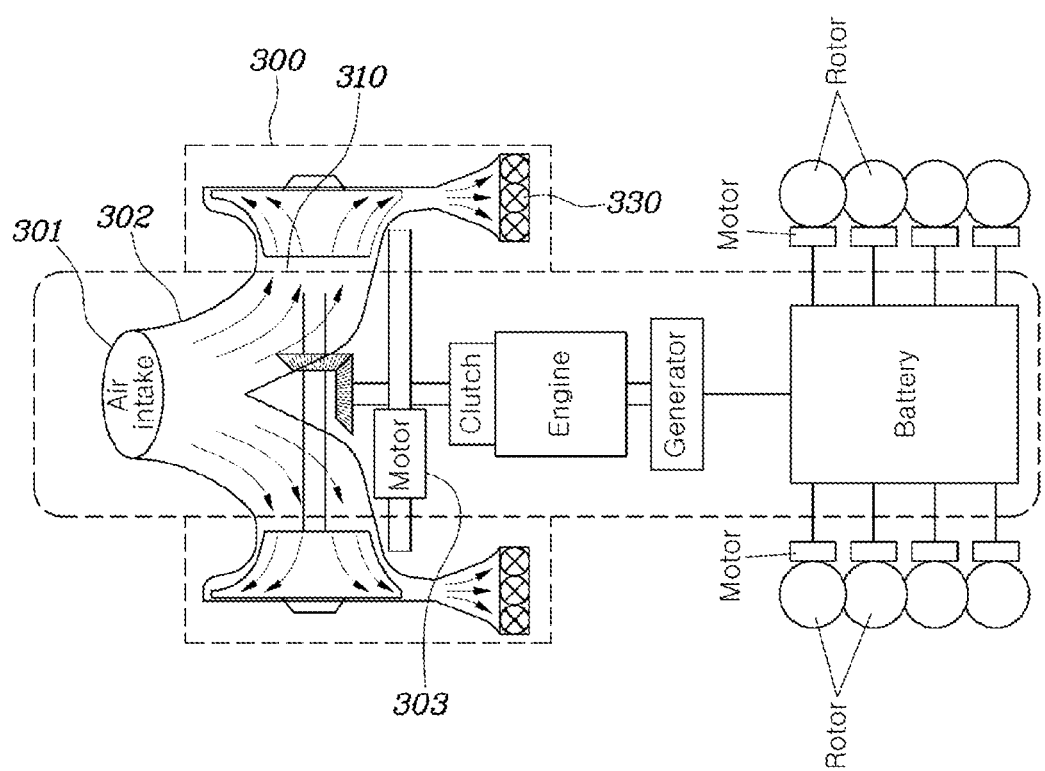
FIG. 4 is a conceptual view illustrating an air mobility vehicle according to another embodiment of the present invention.

FIGS. 1 and 2 are conceptual views illustrating an air mobility vehicle according to an embodiment of the present invention, FIG. 3 is a diagram illustrating an auxiliary rotor of the air mobility vehicle according to an embodiment of the present invention, and FIG. 4 is a conceptual view illustrating an air mobility vehicle according to another embodiment of the present invention.

FIGS. 1 and 2 are conceptual views illustrating an air mobility vehicle according to an embodiment of the present invention. The air mobility vehicle according to the embodiment includes an engine 100 operating as required to provide mechanical driving force or electric energy, a battery 500 configured to be charged with the electric energy from the engine 100, main rotors 700 operating using the electric energy of the battery 500 and the power generated by the engine 100 to perform takeoff, landing, and cruising, auxiliary rotors 300 disposed at or adjacent to the center of gravity of a vehicle body and mechanically connected to the engine 100 via a clutch 140, the auxiliary rotors 300 performing the takeoff, the landing, or the cruising by receiving the mechanical driving force from the engine 100 when the clutch 140 is in an engaged position, and a controller monitoring the states of the battery 500 and the main rotors 700 and controlling the operations of the engine 100 and the clutch 140.

An embodiment of the present invention applies the auxiliary rotor separately from the main rotor in order to add propulsion force or safely cope with the malfunction of the main rotor. In particular, while the auxiliary rotors are used, the balance of the vehicle body may be properly maintained. In addition, a passenger space inside a cabin may be reduced by a minimum amount, thereby providing a design by which an inner space may be advantageously obtained.

A fixed-wing air mobility vehicle is a device devised in an idea to realize a fixed-wing vertical takeoff and landing air mobility vehicle that may maneuver at a higher speed than existing helicopters. A helicopter-type rotor exposed externally may have a higher danger of casualty in the case of crash. In the case of a ducted fan in which the rotor is surrounded inside the duct, there is a concern for rotor performance degradation by the inlet flow separation and the drag of the duct may be significantly increased. Thus, the use of small-size and high-power impellers screened with vanes as main lifting devices and power generating devices has been devised. This approach is devised to draw air through a plurality of inlets using impellers, bring the drawn air into combustion through a plurality of flow paths, and discharge combustion gas through a plurality of outlets, thereby generating propulsion force and power. In addition, for the vertical takeoff and landing air mobility vehicle, a fan-based vertical takeoff and landing device has been devised. Such a fan-based vertical takeoff and landing device may be provided with wings so as to obtain a 4 or more lift-to-drag ratio during cruising.

An embodiment of the present invention provides a layout and mounting structure of an auxiliary propulsion device for an air mobility vehicle having an engine-battery hybrid propulsion system. The vertical takeoff and landing maneuver of rotors in the maneuvers of air mobility vehicles is a factor that has a highest accident rate and thus must be considered with top priority to provide high reliability. The auxiliary propulsion device is a device that provides safety to the air mobility vehicle in an emergency, such as a breakdown of the rotor or a malfunction of a distributed electric propulsion system, during the vertical takeoff or landing operation. When the auxiliary propulsion device is located adjacent to the center of gravity of the air mobility vehicle, the auxiliary propulsion device may directly support the center of gravity, thereby achieving an effect similar to reducing the weight of the air mobility vehicle. Accordingly, even in an emergency, when the entire moment of major propulsion devices, such as the rotors, applied to the air mobility vehicle may be reduced, the presence of the auxiliary propulsion devices may provide significantly higher reliability.

In an embodiment of the present invention, as illustrated in FIGS. 1 and 2, the center of gravity of the air mobility vehicle is set to be balanced in the longitudinal direction, with the battery 500 being disposed in the rear part of the vehicle body, and a cabin C being disposed in the front part of the vehicle body. Alternatively, the battery 500 may be disposed collinear with wings of the vehicle body. In addition, the engine 100 is disposed between the battery 500 and the cabin C such that the center of gravity is balanced. Here, the engine 100 may be an internal combustion engine.

In addition, the air mobility vehicle is designed such that the resultant center of gravity of the vehicle body is adjacent to the pilot seat in the front portion of the cabin C. In addition, the auxiliary rotors 300 are disposed adjacent to the pilot seat, such that the balance of the vehicle body may be easily controlled in the longitudinal direction even when the auxiliary rotors 300 are being driven. Accordingly, a passenger space may be obtained as large as possible.

When the engine 100 is operated, the battery 500 may be charged using a generator 120, and the main rotors 700 may be driven. A drive shaft 16o may be driven via the clutch 140 connected to the engine 100 and the drive shaft 160. The drive shaft 160 is connected to a bevel gear, a differential gear, or the like to provide rotational force to a division shaft 180 extending in a transverse direction. In addition, the division shaft 180 rotates rotor shafts 340 of the auxiliary rotors 300 via bevel gears or the like, thereby mechanically rotating the auxiliary rotors 300 using the engine 100. Thus, the auxiliary rotors 300 are only provided with fans and are connected to the engine 100 via shafts. Since the auxiliary rotors 300 occupy a smaller space than a jet engine or the like, a larger space may be obtained for the cabin C. In addition, the engine 100 may contribute to the charging of the battery 500 or supporting power supply to the main rotor 700 at ordinary times, thereby advantageously increasing the ferry range of the air mobility vehicle.

That is, the engine 100 is operated as required to provide mechanical driving force or electric energy. The main rotors 700 are driven by the electric energy of the battery 500 to perform the takeoff, the landing, and the cruising.

The auxiliary rotors 300 are disposed adjacent to the center of gravity of the vehicle body such that the balance of the vehicle body may be easily controlled during the driving of the auxiliary rotors 300. In addition, the auxiliary rotors 300 are mechanically connected to the engine 100 via the clutch 140, and when the clutch 140 is in the engaged position, receive mechanical driving force from the engine 100, thereby performing the takeoff, the landing, or the cruising. The controller monitors the states of the battery 500 and the main rotors 700 and controls the operations of the engine 100 and the clutch 140 only when required, thereby allowing the air mobility vehicle to be driven as environmentally friendly as possible.

In addition, the battery 500 is provided in the separate place such as behind the cabin C or collinear with the wings of the vehicle body, and the main rotors 700 may be provided to the right and left of the battery 500 in the same numbers. This configuration may effectively maintain the center of gravity of the vehicle body and secure the largest space for the cabin C.

In addition, the auxiliary rotors 300 may be provided to the right and left of the cabin C, respectively. According to this configuration, even in the case that at least one of the main rotors 700 in one side malfunctions, the balance of the vehicle body in the transverse direction may be easily controlled in a sufficiently responsive manner.

In addition, the auxiliary rotors 300 may be provided to be consistent with the center of gravity of the vehicle body in the transverse direction while being located at a distance within 0.002 times the length of the vehicle body from the center of gravity of the vehicle body in the longitudinal direction. Accordingly, even during the operation of the auxiliary rotors 300, no moment in the longitudinal direction of the vehicle body may be generated, so that the balancing of the vehicle body may be easily performed without a specific control operation, thereby improving the responding ability in an emergency.

In addition, the engine 100 is located at a point (or a portion) between the auxiliary rotors 300 and the battery 500. The drive shaft 160 is provided in a front portion of the engine 100, portions of the division shaft 180 extending to the right and the left receive driving force via the drive shaft 160, and the auxiliary rotors 300 may be rotated by the division shaft 180. This may facilitate the obtaining of the center of gravity of the vehicle body, and in particular, may minimize the interference of the space for the cabin C, thereby achieving an advantageous effect for the layout.

In addition, as illustrated in FIG. 3, the auxiliary rotors 300 may be oriented in the vertical direction so as to provide downward auxiliary propulsion when driven, thereby assisting in the lifting of the vehicle body. In particular, auxiliary rotors 300 are concealed with covers 320, respectively. When the auxiliary rotors 300 are driven, the covers 320 are slid so that the auxiliary rotors 300 are exposed externally. In this position, the auxiliary rotors 300 may draw air from above and discharge the drawn air downwards.

The covers 320 are operated using a separate motor or the like. When the covers 320 are slid, the covers 320 are received into the vehicle body, and the auxiliary rotors 300 are exposed from above. Thus, when the covers 320 are received, the auxiliary rotors 300 provide downward propulsion for lifting. When the covers 320 are concealing the auxiliary rotors 300 instead of being received, even when the auxiliary rotors 300 are rotating, air is not introduced from above, thereby significantly limiting downward propulsion. Thus, even when the auxiliary rotors 300 on both sides are simultaneously rotated in response to the operation of the engine 100, the auxiliary rotors 300 provide propulsion only when the covers are opened. Accordingly, even in a case in which at least one of the main rotors 700 malfunctions so that propulsion is unbalanced in the transverse direction, a responsive operation may be flexibly performed.

Specifically, when the state of charge of the battery 500 is low, the controller charges the battery 500 or supports power supply to the main rotor 700 by operating the engine 100. When the driving force of the main rotors 700 is insufficient or the main rotors 700 malfunction, the auxiliary rotors 300 may be driven by moving the clutch 140 to the engaged position. In particular, when the driving force of the main rotors 700 is insufficient, the controller may generate the same auxiliary propulsion force on the right side and the left side by opening both the covers 320 of the right and left auxiliary rotors 300. In addition, when one of the right and left main rotors 700 malfunctions, the controller may open one of the covers 320 on the same side as the malfunctioning main rotor, thereby generating auxiliary propulsion on the side in which the malfunction has occurred.

On the other hand, FIG. 4 relates to another embodiment of the present invention. In this case, each of the auxiliary rotors 300 includes an inlet 310 and an outlet 330 by which an air flow is produced. The auxiliary rotor 300 is rotatably coupled to the vehicle body, and the direction of the outlet 330 may be changed when the auxiliary rotor 300 rotates.

Specifically, the auxiliary rotor 300 is a centrifugal compressor-type rotor that draws air in the direction of the rotor shaft thereof and discharges the air in the radial direction. The auxiliary rotor 300 is disposed such that the rotor shaft thereof is directed toward the center of gravity of the vehicle body, and the inlet 310 is provided at a portion in which the rotor shaft is provided, such that the inlet 310 may be oriented in the same direction even when the auxiliary rotor 300 rotates. In addition, the outlet 330 is provided in the radial direction of the auxiliary rotor 300 such that the auxiliary rotor 300 may assist in lifting propulsion or cruising propulsion in response to the rotation of the auxiliary rotor 300. In addition, an air intake 301 is provided in a front portion of the vehicle body. The air intake 301 may supply air to the inlets 310 of the auxiliary rotors 300 located on both sides through an internal duct 302. In addition, the angles of rotation of the auxiliary rotors 300 may be changed using a separate motor 303.

This embodiment is advantageous in that the auxiliary rotors 300 do not only provide propulsion force for the lifting but also selectively provide auxiliary propulsion force for the cruising. In the same manner, this structure is significantly advantageous for obtaining the space for the cabin C, since the cabin C is provided with no separate components and the shaft or the duct is only required to be designed so as not to interfere with the cabin.

In the air mobility vehicle having the vertical takeoff and landing function and the cruising function according to embodiments of the present invention, when the propulsion force of the main rotors is insufficient or at least one of the main rotors malfunctions, auxiliary propulsion force may be reliably provided so as to increase the safety of flight. In particular, even when one of the main rotors malfunctions so that propulsion is unbalanced or the lifting function or the cruising function malfunctions, a responsive operation may be flexibly performed to balance the vehicle body.

Although the specific embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An air mobility vehicle comprising:
   a vehicle body that includes a cabin;
   an engine mounted in the vehicle body and configured to provide mechanical driving force or electric energy;
   a battery configured to be charged with the electric energy from the engine;
   main rotors configured to operate using the electric energy of the battery and electric power generated by the engine to perform takeoff, landing, and cruising;
   auxiliary rotors disposed at or adjacent to a center of gravity of the vehicle body, each of the auxiliary rotors being rotatably coupled to the vehicle body and mechanically connected to the engine via a clutch, the auxiliary rotors configured to perform the takeoff, the landing, or the cruising by receiving the mechanical driving force from the engine when the clutch is in an engaged position;
   a motor coupled to the auxiliary rotors and configured to rotate the auxiliary rotors between a first position and a second position; and
   a controller configured to monitor states of the battery and the main rotors and to control operations of the engine and the clutch;
   wherein each of the auxiliary rotors comprise an inlet; and
   wherein the vehicle body comprises an air intake in a front portion thereof and the air intake is configured to supply air to the inlets of the auxiliary rotors located on both sides through an internal duct.

2. The air mobility vehicle of claim 1, wherein each of the auxiliary rotors further comprises an outlet configured to produce an air flow.

3. The air mobility vehicle of claim 2, wherein, for each auxiliary rotor, a direction of the outlet is configured to change when the auxiliary rotor rotates.

4. The air mobility vehicle of claim 1, wherein the engine comprises an internal combustion engine.

5. The air mobility vehicle of claim 1, wherein the battery is provided in the cabin of the vehicle body or collinear with wings of the vehicle body, and the main rotors are provided right and left of the battery in equal numbers.

6. The air mobility vehicle of claim 1, wherein the auxiliary rotors are provided right and left of the cabin.

7. The air mobility vehicle of claim 1, wherein the auxiliary rotors are provided to be consistent with the center of gravity of the vehicle body in a transverse direction while being located at a distance within 0.002 times a length of the vehicle body from the center of gravity of the vehicle body in a longitudinal direction.

8. The air mobility vehicle of claim 1, wherein the engine is located at a point between the auxiliary rotors and the battery, wherein the engine is provided with a drive shaft in a front portion of the engine, portions of a division shaft extending right and left of the engine are configured to receive driving force via the drive shaft, and wherein the auxiliary rotors are configured to be rotated by the division shaft.

9. The air mobility vehicle of claim 1, wherein the auxiliary rotors are oriented in a vertical direction to provide auxiliary propulsion force in a downward direction to assist in lifting of the vehicle body.

10. The air mobility vehicle of claim 1, wherein, when the state of charge of the battery is low, the controller is configured to charge the battery or support power supply to the main rotors by operating the engine, and when driving force of the main rotors is insufficient or at least one of the main rotors malfunctions, at least one of the auxiliary rotors is configured to be driven by movement of the clutch to the engaged position.

11. An air mobility vehicle comprising:
   a vehicle body;
   an engine mounted in the vehicle body and configured to provide mechanical driving force or electric energy;
   a battery configured to be charged with the electric energy from the engine;
   main rotors configured to operate using the electric energy of the battery and electric power generated by the engine to perform takeoff, landing, and cruising;
   auxiliary rotors disposed at or adjacent to a center of gravity of the vehicle body, each of the auxiliary rotors being rotatably coupled to the vehicle body and mechanically connected to the engine via a clutch; and
   a controller configured to monitor states of the battery and the main rotors and to control operations of the engine and the clutch;
   wherein the auxiliary rotors are configured to perform the takeoff, the landing, or the cruising by receiving the mechanical driving force from the engine when the clutch is in an engaged position;
   wherein each of the auxiliary rotors comprises an inlet and an outlet configured to produce an air flow;
   wherein a direction of the outlet is configured to change when the auxiliary rotor rotates;
   wherein each of the auxiliary rotors comprises a centrifugal compressor-type rotor configured to draw air in a direction of a rotor shaft thereof and discharge the air in a radial direction; and
   wherein the vehicle body comprises an air intake in a front portion thereof and the air intake is configured to supply air to the inlets of the auxiliary rotors located on both sides through an internal duct.

12. An air mobility vehicle comprising:
a vehicle body;
an engine mounted in the vehicle body and configured to provide mechanical driving force or electric energy;
a battery configured to be charged with the electric energy from the engine;
main rotors configured to operate using the electric energy of the battery and electric power generated by the engine to perform takeoff, landing, and cruising;
auxiliary rotors disposed at or adjacent to a center of gravity of the vehicle body, each of the auxiliary rotors being rotatably coupled to the vehicle body and mechanically connected to the engine via a clutch; and
a controller configured to monitor states of the battery and the main rotors and to control operations of the engine and the clutch;
wherein the auxiliary rotors are configured to perform the takeoff, the landing, or the cruising by receiving the mechanical driving force from the engine when the clutch is in an engaged position;
wherein each of the auxiliary rotors comprises an inlet and an outlet configured to produce an air flow;
wherein a direction of the outlet is configured to change when the auxiliary rotor rotates;
wherein each of the auxiliary rotors comprises a centrifugal compressor-type rotor configured to draw air in a direction of a rotor shaft thereof and discharge the air in a radial direction; and
wherein each centrifugal compressor-type rotor disposed such that the rotor shaft is directed toward the center of gravity of the vehicle body, and the inlet is provided at a portion in which the rotor shaft is provided, such that the inlet is oriented in the same direction even when the auxiliary rotor rotates.

13. The air mobility vehicle of claim 11, wherein the outlet is provided in the radial direction of the auxiliary rotor such that the auxiliary rotor is configured to assist in lifting propulsion or cruising propulsion in response to rotation thereof.

14. A method of operating an air mobility vehicle that includes a vehicle body, an engine mounted in the vehicle body and configured to provide mechanical driving force or electric energy, a battery configured to be charged with the electric energy from the engine, main rotors configured to operate using the electric energy of the battery and electric power generated by the engine to perform takeoff, landing, and cruising, auxiliary rotors disposed at or adjacent to a center of gravity of the vehicle body, each of the auxiliary rotors being rotatably coupled to the vehicle body and mechanically connected to the engine via a clutch, and a controller configured to monitor states of the battery and the main rotors and to control operations of the engine and the clutch, the method comprising:
charging the battery with electric energy from the engine; and
operating main rotors using the electric energy of the battery and electric power generated by the engine to perform takeoff, landing, and cruising;
wherein the auxiliary rotors are in a first position during the takeoff and the landing;
wherein the auxiliary rotors are in a second position different than the first position during the cruising;
wherein each of the auxiliary rotors comprise an inlet; and
wherein the vehicle body comprises an air intake in a front portion thereof and the air intake is configured to supply air to the inlets of the auxiliary rotors located on both sides through an internal duct.

15. The method of claim 14, wherein the auxiliary rotors are disposed at or adjacent to a center of gravity of the vehicle body.

16. The method of claim 14, wherein the auxiliary rotors draw air from above and discharge the drawn air downward when in the first position during the takeoff and the landing.

17. The method of claim 14, wherein the auxiliary rotors are configured to be operated by receiving a mechanical driving force from the engine when a clutch is in an engaged position.

18. The method of claim 17, further comprising monitoring states of the battery and the main rotors and controlling operations of the engine and the clutch.

19. The method of claim 17, further comprising:
charging the battery or supporting power supply to the main rotors by operating the engine when the state of charge of the battery is low; and
driving at least one of the auxiliary rotors by movement of the clutch to the engaged position, when a driving force of the main rotors is insufficient or at least one of the main rotors malfunctions.

20. The air mobility vehicle of claim 12, wherein, for each auxiliary rotor, the outlet is provided in the radial direction of the auxiliary rotor such that the auxiliary rotor is configured to assist in lifting propulsion or cruising propulsion in response to rotation thereof.

* * * * *

UNITED STATES PATENT AND TRADEMARK OFFICE
CERTIFICATE OF CORRECTION

| | |
|---|---|
| PATENT NO. | : 11,939,049 B2 |
| APPLICATION NO. | : 17/947357 |
| DATED | : March 26, 2024 |
| INVENTOR(S) | : Jung et al. |

It is certified that error appears in the above-identified patent and that said Letters Patent is hereby corrected as shown below:

In the Claims

In Column 10, in Claim 14, Line 9, delete "main" and insert -- the main --.

Signed and Sealed this
Thirtieth Day of April, 2024

Katherine Kelly Vidal
*Director of the United States Patent and Trademark Office*